US006652248B2

(12) United States Patent
Watkins et al.

(10) Patent No.: US 6,652,248 B2
(45) Date of Patent: Nov. 25, 2003

(54) CATALYST BED

(75) Inventors: William B. Watkins, Tequesta, FL (US); Fred Honeycutt, Jr., Palm Beach Garden, FL (US); Robert Carroll, West Palm Beach, FL (US); Donald R. Connell, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 28 days.

(21) Appl. No.: 09/896,355

(22) Filed: Jun. 29, 2001

(65) Prior Publication Data

US 2003/0074887 A1 Apr. 24, 2003

(51) Int. Cl.[7] .......................... F04B 17/00; B01D 50/00
(52) U.S. Cl. .......................... 417/381; 422/179; 60/214
(58) Field of Search .......................... 417/381; 60/214, 60/615; 422/179, 177, 180, 211, 221, 222

(56) References Cited

U.S. PATENT DOCUMENTS

| 3,488,962 A | | 1/1970 | McCormick ................. 60/218 |
| 3,570,249 A | * | 3/1971 | Baum et al. .................. 60/259 |
| 3,692,497 A | * | 9/1972 | Keith et al. .................. 422/179 |
| 4,004,413 A | * | 1/1977 | Ueno et al. ............... 60/39.462 |
| 4,065,918 A | * | 1/1978 | Rifkin .......................... 60/274 |
| 4,731,989 A | | 3/1988 | Furuya et al. ................. 60/775 |
| 5,346,417 A | * | 9/1994 | Isogawa ....................... 440/89 |
| 5,573,736 A | | 11/1996 | Jubin, Jr. ..................... 422/191 |
| 5,711,146 A | | 1/1998 | Armstrong et al. ........... 60/218 |
| 6,000,212 A | | 12/1999 | Kolaczkowski et al. ...... 60/776 |
| H1948 H | | 3/2001 | Rusek et al. ................ 502/344 |

FOREIGN PATENT DOCUMENTS

| WO | WO 01/07772 A1 | 1/2001 | ............. F02K/9/74 |
| WO | WO 01/07773 A1 | 1/2001 | ............. F02K/9/74 |

* cited by examiner

*Primary Examiner*—Charles G. Freay
*Assistant Examiner*—Michael K. Gray
(74) *Attorney, Agent, or Firm*—Brian J. Hamilla

(57) ABSTRACT

A catalyst bed assembly, comprising: an outer housing having an open interior, an inlet leading to the open interior, and an outlet from the open interior; a catalyst bed in the open interior; and a gap between the outer housing and the catalyst bed. The open interior receives material from the inlet. A portion of the material enters the catalyst bed to expose said material to a catalyst so that the material and the catalyst react and create heat within the catalyst bed assembly. A remainder of the material enters the gap between the outer housing and the catalyst bed to cool the catalyst bed assembly. The catalyst bed assembly could be part of a turbopump assembly. The turbopump assembly would further include a nozzle downstream of the outlet; a turbine downstream of the nozzle; and a pump driven by said turbine.

19 Claims, 6 Drawing Sheets

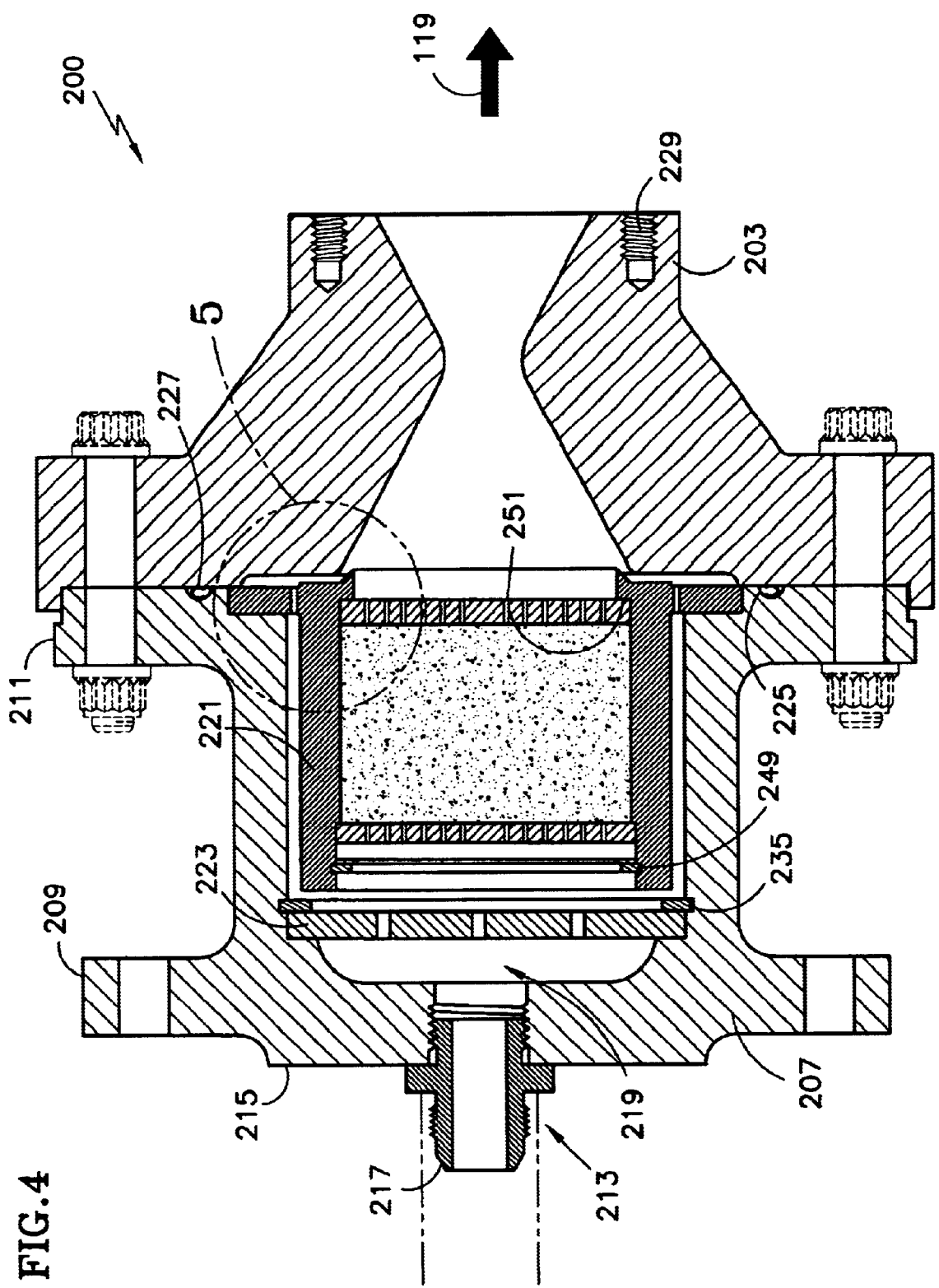

CATALYST BED

TECHNICAL FIELD

This invention relates to a catalyst bed assembly. More particularly, this invention relates to a catalyst bed assembly used in a rocket propulsion system.

BACKGROUND OF THE INVENTION

FIG. 1 is a schematic of a rocket propulsion system 100. The system 100 includes a rocket engine 101. A fuel pump 103 supplies fuel to the rocket engine 101 from a fuel supply 105. Likewise, an oxidizer pump 107 supplies oxidizer to the rocket engine from an oxidizer supply 109. The rocket engine 101 combines the fuel and oxidizer, and ignites the mixture in a combustion chamber (not shown). The exhaust 111 exits a nozzle (not shown) to produce thrust.

To provide the amount of fuel and oxidizer required by the rocket engine 101, pumps 103, 107 are preferably turbopumps. FIG. 2 is a schematic of a turbopump assembly 107. Generally speaking, the turbopump assembly 107 includes a turbine 113 connected to an impeller 115 by a shaft 117. The turbine 113 converts the kinetic energy from an exhaust stream 119 into shaft horsepower to drive the impeller 115. The impeller 115 transports the oxidizer from the supply 109 to the rocket engine 101. Turbopump 103 for the fuel operates in a similar manner, and is not described in further detail.

In a rocket propulsion system using kerosene as the fuel and hydrogen peroxide as the oxidizer, the exhaust stream 119 that is used to drive the turbopump 107 can be created by a catalyst bed assembly which converts the hydrogen peroxide into oxygen and water vapor. The conversion of hydrogen peroxide also generates heat. In previous propulsion systems, which used less pure (e.g. a lower wt-%) hydrogen peroxide, the management of the heat produced by such conversion was not a major concern.

Future rocket propulsion systems, however, plan to use higher purity (e.g. greater wt-%) hydrogen peroxide. As the concentration of hydrogen peroxide increases, the heat generated during the decomposition of hydrogen peroxide into water vapor and oxygen also increases. As an example, conversion of concentrate (98 wt-%) hydrogen peroxide can generate temperatures of approximately 2192° R. Clearly, thermal management of this increased heat becomes a concern. The catalyst bed assemblies used in these systems must be designed to withstand the increased heat.

However, the techniques used to manage the increased heat in the catalyst bed assembly should not significantly affect other aspects of the system. For example, the catalyst bed assembly design should keep weight to a minimum. Preferably, the catalyst bed assembly should be designed without a need for cooling lines. The catalyst bed design should also avoid complexity.

DISCLOSURE OF THE INVENTION

It is an object of the present invention to provide a new and improved catalyst bed assembly.

It is a further object of the present invention to provide a catalyst bed assembly capable of managing higher temperatures.

It is a further object of the present invention to provide a relatively lightweight catalyst bed assembly.

It is a further object of the present invention to provide a relatively non-complex catalyst bed assembly.

These and other objects of the present invention are achieved in one aspect by a catalyst bed assembly. The catalyst bed assembly includes: an outer housing having an open interior, an inlet leading to the open interior, and an outlet from the open interior; a catalyst bed in the open interior; and a gap between the outer housing and the catalyst bed. The open interior receives a material from the inlet. A portion of the material enters the catalyst bed to expose the material to a catalyst so that the material and the catalyst react and create heat within the catalyst bed assembly. A remainder of the material enters the gap between the outer housing and the catalyst bed to cool the catalyst bed assembly.

These and other objects of the present invention are achieved in another aspect by a turbopump assembly. The turbopump assembly includes a catalyst bed assembly, a nozzle, a turbine and a pump. The catalyst bed assembly includes: an outer housing having an open interior, an inlet leading to the open interior, and an outlet from the open interior; a catalyst bed in the open interior of the container; and a gap between the outer housing and the catalyst bed. The nozzle is located downstream of the outlet. The turbine is located downstream of the nozzle. The turbine drives the pump. The open interior receives a material from the inlet. A portion of the material can enter the catalyst bed to expose the material to a catalyst so that the material and the catalyst react and create heat within the catalyst bed assembly. A remainder of the material can enter the gap between the outer housing and the catalyst bed to cool the catalyst bed assembly.

These and other objects of the present invention are achieved in another aspect by a method of cooling a catalyst bed assembly. The method includes the steps of: providing a gap between an outer housing and a catalyst bed; and introducing material into the gap between the outer housing and the catalyst bed to cool the catalyst bed assembly.

BRIEF DESCRIPTION OF THE DRAWINGS

Other uses and advantages of the present invention will become apparent to those skilled in the art upon reference to the specification and the drawings, in which:

FIG. 3b is a perspective view of the downstream end of the catalyst bed assembly shown in FIG. 3a;

FIG. 4 is a cross-sectional view of the catalyst bed assembly taken along line IV—IV in FIG. 3a;

FIG. 9 is front view of a pressure baffle used in the catalyst bed assembly shown in FIG. 3a;

BEST MODE FOR CARRYING OUT THE INVENTION

Figure 1:
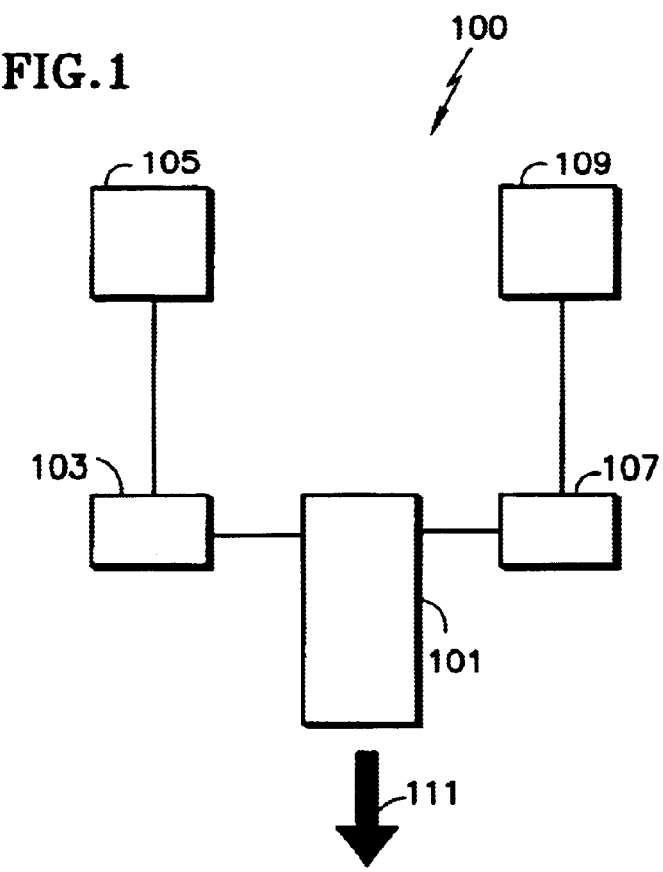
FIG. 1 is a schematic of the components of a rocket propulsion system.
Figure 2:
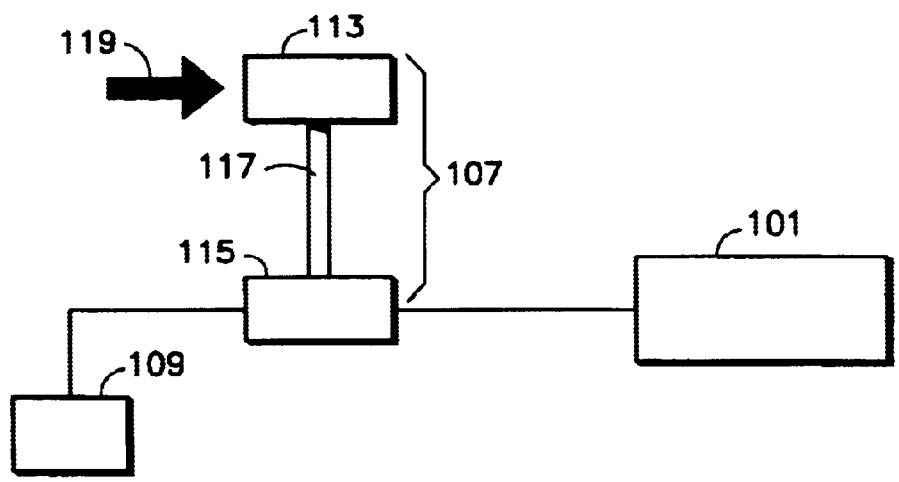
FIG. 2 is a schematic of a turbopump assembly.
Figure 3A:
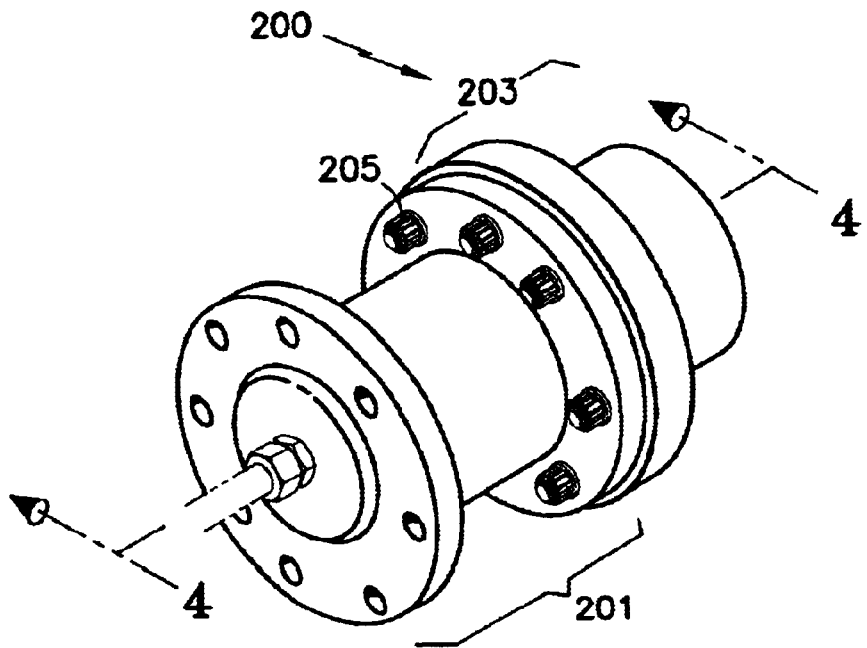
FIG. 3a is a perspective view of the upstream end of a catalyst bed assembly.
Figure 3B:
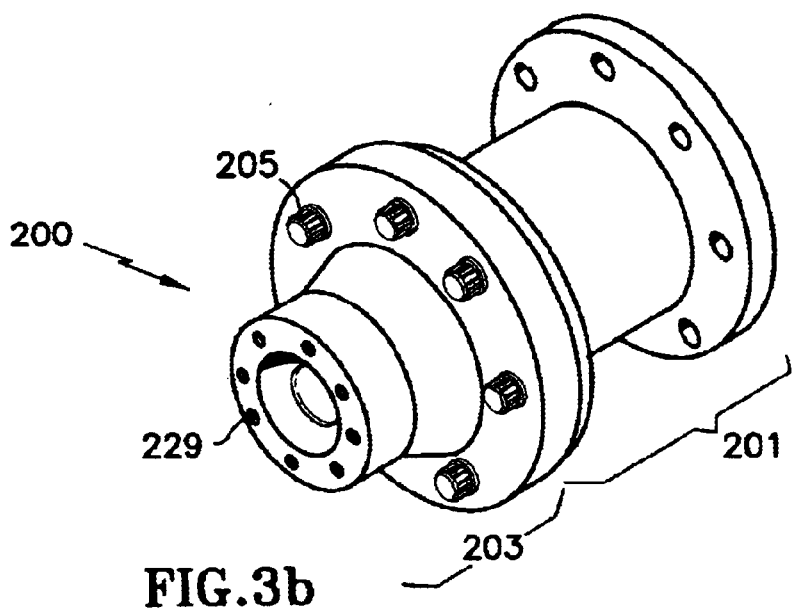

FIGS. 3a and 3b show perspective views of a catalyst bed assembly 200. The catalyst bed assembly 200 includes a catalyst bed section 201 and a nozzle section 203. The nozzle section 203 secures to the catalyst bed section 201 with suitable fasteners 205. As an example, the catalyst bed section 201 has an inner diameter of approximately 4 inches. However, any suitable size could be used. Each component of the catalyst bed assembly 200 will now be described.

FIG. 4 shows a cross-section view of the catalyst bed assembly 200, including the nozzle section 203. The nozzle section 203 resides at the downstream, or outlet, end of the catalyst bed 201. The nozzle 203 receives the discharge from the catalyst bed section 201. The nozzle accelerates the discharge from the catalyst bed section 201 to form the exhaust stream 119. As described earlier, the exhaust stream 119 leaving nozzle 203 can drive the turbine 113 in the turbopump 107. Although shown as a convergent-divergent nozzle, the present invention could use any suitable nozzle arrangement.

The nozzle section 203 can have threaded openings 229 for securing to the turbopump 107. Also, the nozzle section 203 could be made from any suitable material, such as a high temperature, non-catalytic aerospace alloy.

Figure 6:
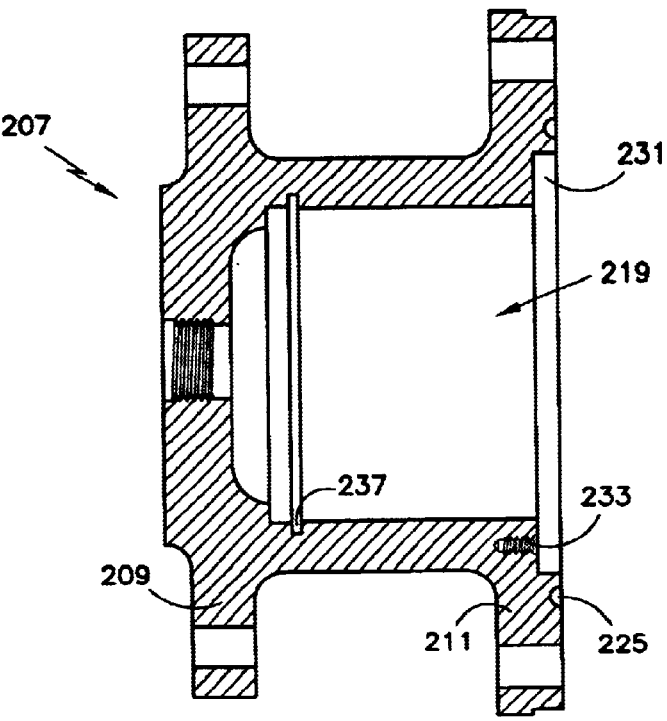
FIG. 6 is a cross-sectional view of the outer housing of the catalyst bed assembly.

Catalyst bed section 201 includes a catalyst can 221 within an outer housing 207. As seen in FIG. 6, outer housing 207 can be a cylindrical pipe having flanges 209, 211 to secure the catalyst bed section 201 to other components. However, other arrangements are possible. Outer housing 207 could be made from any suitable material, such as a high temperature, non-catalytic aerospace alloy.

The outer housing 207 secures to nozzle section 203 using fasteners 205. As seen in FIG. 4, flange 211 includes an annular groove 225 within which a C-shaped (in cross-section) annular metal seal 227 resides. The seal 227 keeps the hydrogen peroxide from escaping from the joint between the catalyst bed section 201 and the nozzle section 203. Although described as a metallic C-shaped annular seal, any suitable seal or sealing arrangement could be used.

The outer housing 207 includes a threaded opening 213 in a front face 215. The opening receives a correspondingly threaded coupling 217 to create an inlet. The coupling 217 secures to a pipe (shown in phantom in FIG. 4) supplying hydrogen peroxide to the catalyst bed assembly 200.

The outer housing 207 includes an open interior 219. The open interior 219 has a suitable size to receive a catalyst can 221. As seen in FIG. 6, the outer housing 207 has an annular shoulder 231 in which a portion of the catalyst can 221 rests. The outer housing 207 also has at least one threaded opening 233 for securing the catalyst can 221 on the shoulder 231 with a suitable fastener (not shown).

Figure 9:
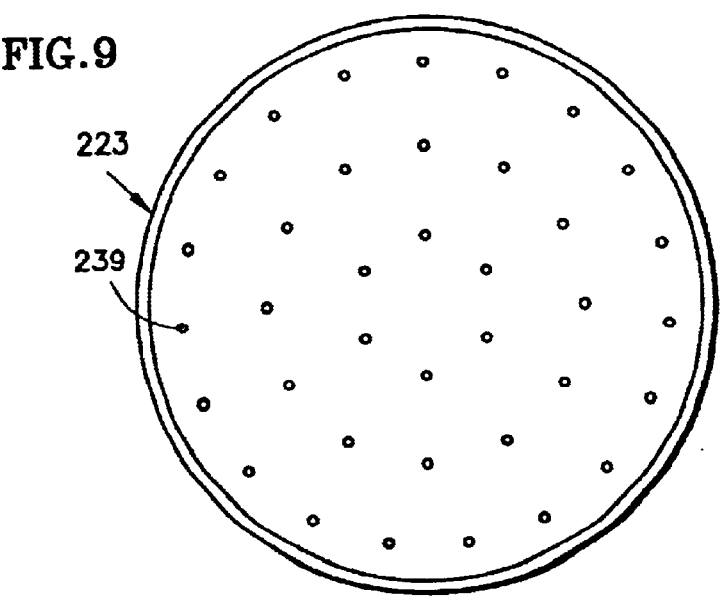

A first pressure baffle 223 resides within the open interior 219 of the outer housing 207. The pressure baffle 223 is preferably made from a high temperature, non-catalytic aerospace alloy. As seen in FIG. 9, the baffle 223 has an array of openings 239 therethrough. Preferably, the baffle 223 has an outer diameter of approximately 3.96" and the openings 239 have a diameter of approximately 0.063". However, other sizes, numbers and arrangements of the apertures could be used to achieve a suitable result. A ring 235 placed in an annular groove 237 on the inner surface of the outer housing 207 retains the pressure baffle 223 within the outer housing 207.

The baffle 223 reduces the pressure of the liquid hydrogen peroxide in the direction of flow. In other words, the pressure of the hydrogen peroxide downstream of the baffle 223 is less than the pressure of the hydrogen peroxide upstream of the baffle.

As will be described in more detail below, neither the outer housing 207 nor the nozzle section 203 require any cooling lines to manage the heat generated in the catalyst can 221 during decomposition of the hydrogen peroxide. Rather, the present invention uses bypass hydrogen peroxide (i.e. hydrogen peroxide that does not enter the catalyst can 221) to cool to outer housing 207 and the nozzle section 203.

Figure 7:
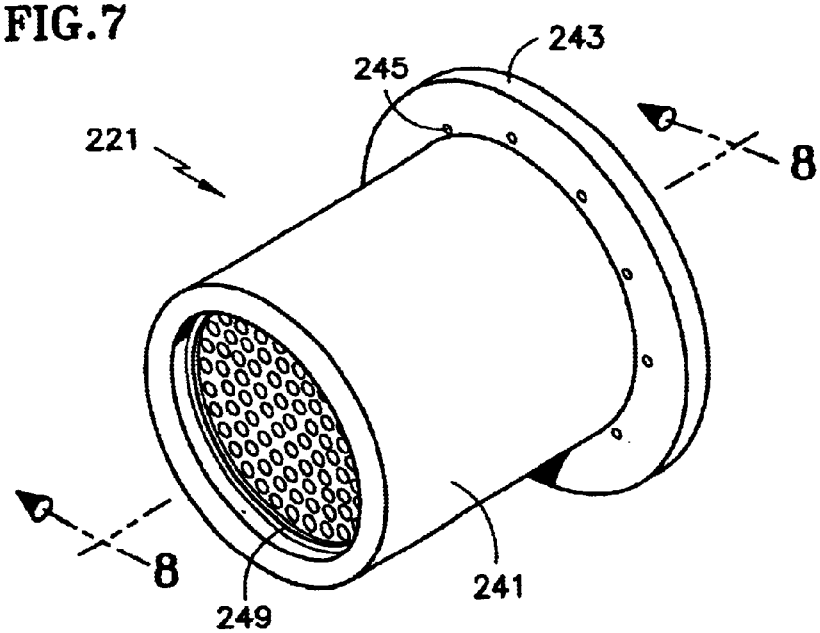
FIG. 7 is a perspective view of the upstream end of a catalyst can.
Figure 8:
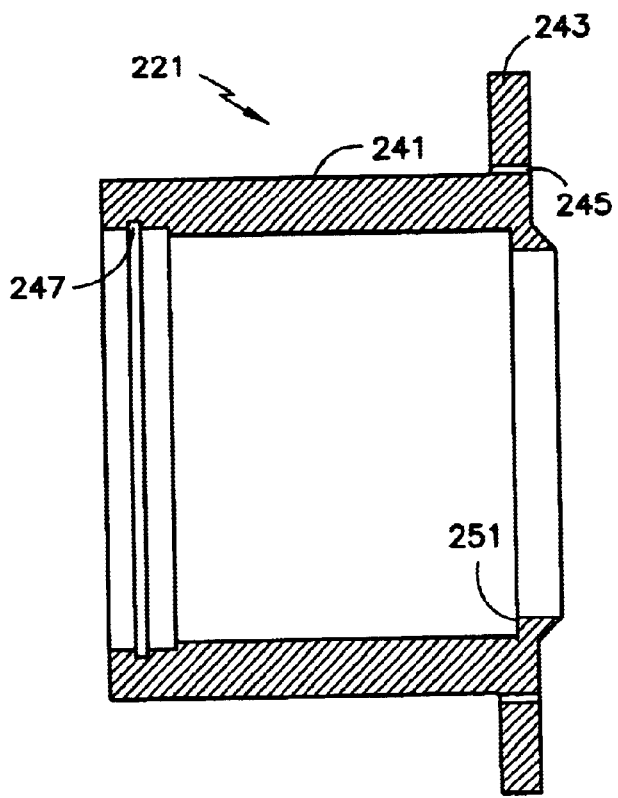
FIG. 8 is a cross-sectional view of the catalyst can taken along line VIII—VIII in FIG. 7.

FIGS. 7 and 8 display the catalyst can 221. The catalyst can 221 is preferably made from a suitable material, such as a high temperature, non-catalytic aerospace alloy. The catalyst can 221 has a cylindrical outer wall 241 with a flange 243. The flange 243 includes a plurality of apertures 245. Preferably, the flange 243 includes 12 equally spaced apertures 245, each having a diameter of 0.100". Again, the size, number and arrangement of apertures could be adjusted to achieve a desired result. The apertures 245 help the bypass hydrogen peroxide cool the nozzle section 203. This feature will be explained in more detail below.

The interior of the catalyst can 221 has an annular groove 247 adjacent the upstream end. As seen in FIGS. 4 and 7, the groove receives a metal ring 249. The downstream end of the catalyst can 221 includes an annular shoulder 251. As seen in FIG. 4, the contents within the catalyst can 221 are retained between the metal ring 249 and the shoulder 251.

Figure 10:
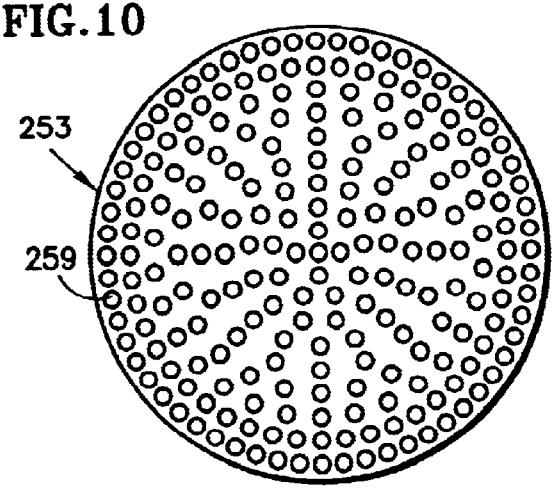
FIG. 10 is a front view of a pressure baffle used in the catalyst can shown in FIG. 7.

The contents within the catalyst can 221 include a second pressure baffle 253, a third pressure baffle 255 and catalyst material 257. The second pressure baffle 253 is located adjacent the ring 249. The second pressure baffle 253 is also preferably made from a high temperature, non-catalytic aerospace alloy. As seen in FIG. 10, the baffle 253 has an array of openings 259 therethrough. Preferably, the baffle 253 has an outer diameter of approximately 2.70" and the openings 259 have a diameter of approximately 0.093". However, other sizes, numbers and arrangements of the apertures 259 could be used to achieve a suitable result.

The ring 249 placed in the annular groove 247 retains the pressure baffle 253 in the catalyst can 221. The baffle 253 serves to reduce the pressure of the liquid hydrogen peroxide in the direction of flow. In other words, the pressure of the hydrogen peroxide downstream of the baffle 253 is less than the pressure of the hydrogen peroxide upstream of the baffle.

Figure 11:
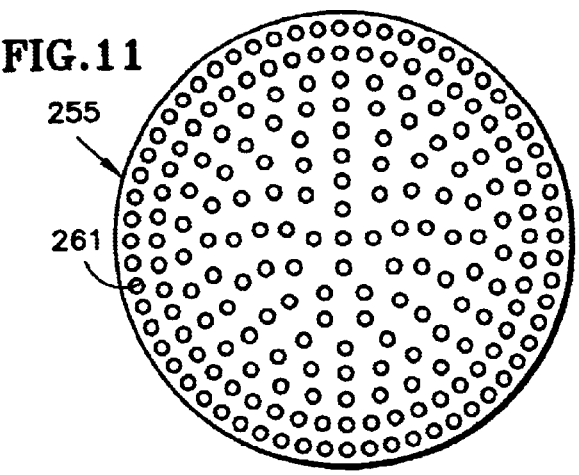
FIG. 11 is a front view of another pressure baffle used in the catalyst can shown in FIG. 7.

The third pressure baffle 255 rests against the shoulder 251. The third pressure baffle 255 is also preferably made from a high temperature, non-catalytic aerospace alloy. As seen in FIG. 11, the baffle 255 has an array of openings 261 therethrough. Preferably, the baffle 255 has an outer diameter of approximately 2.70" and the openings 261 have a diameter of approximately 0.078". However, other sizes, numbers and arrangements of the apertures 261 could be used to achieve a suitable result.

The catalyst material 257 resides between the second pressure baffle 253 and the third pressure baffle 255. Preferably, the catalyst material 257 comprises a bed of silver alloy. However, any catalyst that is useful in decomposing the hydrogen peroxide could be used.

The assembly of the catalyst can 221 will now be described with reference to FIGS. 4, 7 and 8. First, the third pressure baffle 255 is seated on the shoulder 251 of the catalyst can 221. Next, the catalyst material 257 is placed into the catalyst can 221. Then, the second pressure baffle 253 is placed into the catalyst can. Finally, the ring 249 is seated into the groove 247 of the catalyst can. The catalyst can 221 is now fully assembly, such as is shown in FIG. 7.

Before the catalyst can 221 is placed into the outer housing 207, the first pressure baffle 223 is placed in the upstream end of the open interior 219 of the outer housing 207 and secured with the ring 235. The catalyst can 221 is then placed into the open interior 219 of the outer housing 207. The flange 243 of the catalyst can rest on the shoulder 231 of the outer housing 207. To ensure suitable retention, the catalyst can 221 can be secured to the outer housing 207 using suitable fasteners (not shown). Finally, the coupling 217 is secured to the opening 213 in the front face 215 of the outer housing 207.

Once the nozzle section 203 is secured to the catalyst bed section 201 and the supply pipe of hydrogen peroxide is secured to the coupling 217, the catalyst bed assembly 200 is ready to decompose the hydrogen peroxide. The supply of hydrogen peroxide enters the catalyst can 221 from the supply pipe with a diameter of approximately 3" at a flow rate of approximately 4–8 pounds per second and a temperature of approximately 100° F. The catalyst material 257 decomposes the liquid hydrogen into water vapor, oxygen and heat. Other temperatures, flow rates and supply pipe sizes could be used to achieve a desired exhaust stream. Within the catalyst can 221, a 98 wt-% hydrogen peroxide would decompose into water vapor and oxygen at approximately 2000 psi and 2192° R.

Figure 5:
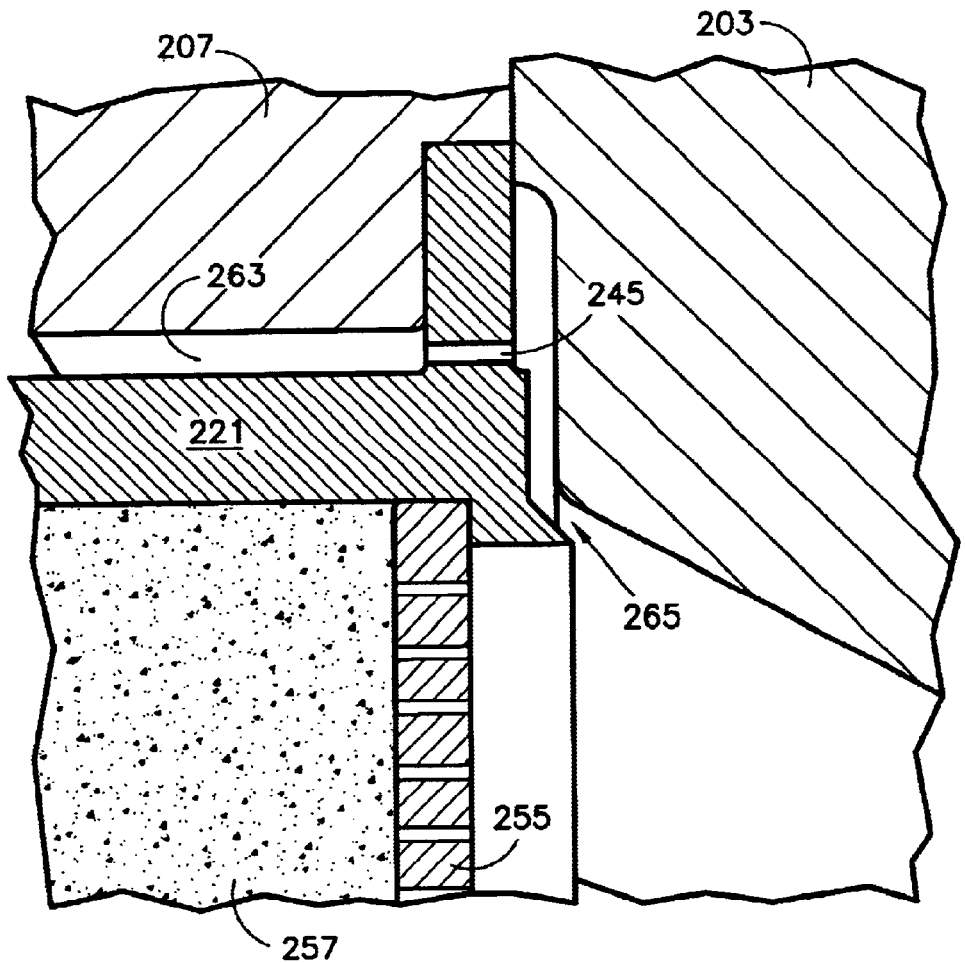
FIG. 5 is a detailed cross-sectional view of a portion of the catalyst bed assembly shown in FIG. 4.

In order to withstand such high temperatures without using complex and heavy cooling schemes, the catalyst bed assembly 200 is designed so that a portion of the supply of hydrogen peroxide bypasses the catalyst can 221. As seen in FIG. 5, a gap 263 exists between the outer housing 207 and the catalyst can 221. The bypass liquid hydrogen peroxide fills the annular gap 263 and serves to cool the catalyst can 221. The liquid hydrogen peroxide in the annular gap 263 also limits heat build-up in the outer housing 207. FIG. 5 shows that the annular gap 263 terminates at flange 243 of the catalyst can 221.

However, the bypass hydrogen peroxide can still flow downstream. The liquid hydrogen peroxide, upon reaching the flange 243, passes through the aforementioned apertures 245 in the flange 243. In other words, the liquid hydrogen peroxide that bypasses the catalyst can travels in the annular gap 263 and through apertures 245 to flow entirely past the catalyst can 221 and towards the nozzle section 203.

Since the nozzle section is likewise exposed to the heat created by the decomposition of the hydrogen peroxide in the catalyst can 221, heat build-up in the nozzle section 203 must also be controlled. Similar to the annular gap 263, a gap 265 exists between the nozzle section 203 and the catalyst can 221 downstream of the catalyst can 221. Preferably, the liquid hydrogen peroxide provides film cooling to the nozzle section 203 while traveling through the nozzle section 203.

Preferably, approximately 95 percent of the hydrogen peroxide enters the catalyst can 221 for decomposition by the catalyst material 257. The remaining 5 percent of the hydrogen peroxide bypasses around the catalyst can 221. In other words, 5 percent of the hydrogen peroxide is used to cool the catalyst bed assembly 200. However, any suitable bypass percentage could be used. The amount of bypass could be controlled by the size of the annular gaps 263, 265, or by the number and the size of the apertures 245.

While mainly for cooling, the bypass hydrogen peroxide may also be used to ensure that the desired amount of oxygen exiting the nozzle section 203 has been produced. Since the decomposition of the hydrogen peroxide produces such a high temperature, the bypass hydrogen peroxide may decompose upon exposure to such high temperature. In other words, the bypass hydrogen peroxide may decompose without exposure to a catalyst.

Although the catalyst bed has been described herein as supplying the exhaust stream to drive the turbine in a turbopump assembly, other uses for the catalyst bed are possible depending, for example, on the type of engine or the type of engine cycle. For example, the catalyst bed could supply the exhaust stream to drive other auxiliary systems in the rocket. Alternatively, the exhaust stream could merely be discharged overboard. Finally, the exhaust stream could be directed to the combustion chamber for use as a propellant for the rocket.

In addition, the present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A catalyst bed assembly, comprising:
    an outer housing having an open interior, an inlet leading to said open interior, and an outlet from said open interior;
    a catalyst bed in said open interior; and
    a gap between said outer housing and said catalyst bed, said gap fluidly communicating with said inlet and outlet;
    wherein said open interior is adapted to receive a material from said inlet, a portion of said material can enter said catalyst bed to expose said material to a catalyst so that said material and said catalyst react and create heat within said catalyst bed assembly, a remainder of said material can enter said gap between said outer housing and said catalyst bed to cool said catalyst bed assembly.

2. The catalyst bed assembly as recited in claim 1, wherein said material comprises hydrogen peroxide.

3. The catalyst bed assembly as recited in claim 1, wherein said catalyst bed includes a flange having apertures therethrough, said apertures in communication with said gap between said outer housing and said catalyst bed.

4. The catalyst bed assembly as recited in claim 1, further comprising a nozzle downstream of said outlet.

5. The catalyst bed assembly as recited in claim 4, wherein said nozzle and said catalyst bed have a gap therebetween to allow said material to enter to cool said nozzle.

6. The catalyst bed assembly as recited in claim 5, wherein said gap between said nozzle and said catalyst bed is in communication with said gap between said outer housing and said catalyst bed.

7. The catalyst bed assembly as recited in claim 5, wherein said gap between said nozzle and said catalyst bed provides film cooling to said nozzle.

8. The catalyst bed assembly as recited in claim 1, wherein said gap between said outer housing and said catalyst bed is sized to allow approximately 5 percent of said material to enter.

9. A turbopump assembly, comprising:
    a catalyst bed assembly, including:
        an outer housing having an open interior, an inlet leading to said open interior, and an outlet from said open interior;

a catalyst bed in said open interior; and a gap between said outer housing and said catalyst bed;

a nozzle downstream of said outlet;

a turbine downstream of said nozzle; and a pump driven by said turbine;

wherein said open interior is adapted to receive a material from said inlet, a portion of said material can enter said catalyst bed to expose said material to a catalyst so that said material and said catalyst react and create heat within said catalyst bed assembly, a remainder of said material can enter said gap between said outer housing and said catalyst bed to cool said catalyst bed assembly, said material comprises hydrogen peroxide.

10. The turbopump assembly as recited in claim 9, wherein said catalyst bed includes a flange having apertures therethrough, said apertures in communication with said gap between said outer housing and said catalyst bed.

11. The turbopump assembly as recited in claim 11, wherein said nozzle and said catalyst bed have a gap therebetween.

12. The turbopump assembly as recited in claim 11, wherein said gap between said nozzle and said catalyst bed is in communication with said gap between said outer housing and said catalyst bed to cool said nozzle.

13. The turbopump assembly as recited in claim 9, wherein said gap between said outer housing and said catalyst bed is sized to allow approximately 5 percent of said material to enter.

14. A method of cooling a catalyst bed assembly, said catalyst bed assembly including a catalyst bed located within an outer housing, said catalyst bed allowing a reaction between a material and a catalyst, the method comprising the steps of:

providing a gap between said outer housing and said catalyst bed, said gap fluidly communicating with an inlet to the outer housing and an outlet from said outer housing; and introducing said material into said gap between said outer housing and said catalyst bed to cool said catalyst bed assembly.

15. The method as recited in claim 14, wherein the introducing step comprises bypassing approximately 5 percent of said material into said gap between said outer housing and said catalyst bed.

16. The method as recited in claim 14, wherein said catalyst bed assembly includes a nozzle downstream of said catalyst bed, and further comprising the steps of:

providing a gap between said nozzle and said catalyst bed; and introducing said material into said gap between said nozzle and said catalyst bed to cool said catalyst bed assembly.

17. The method as recited in claim 16, wherein said gap between said outer housing and said catalyst bed is in communication with said gap between said nozzle and said catalyst bed.

18. The method as recited in claim 16, wherein the introducing step provides film cooling to said nozzle.

19. The method as recited in claim 14, wherein said material is hydrogen peroxide.

* * * * *